Oct. 2, 1951 P. W. MORRISSEY 2,570,147
FIELD FORAGE HARVESTER
Filed March 14, 1947 3 Sheets-Sheet 2

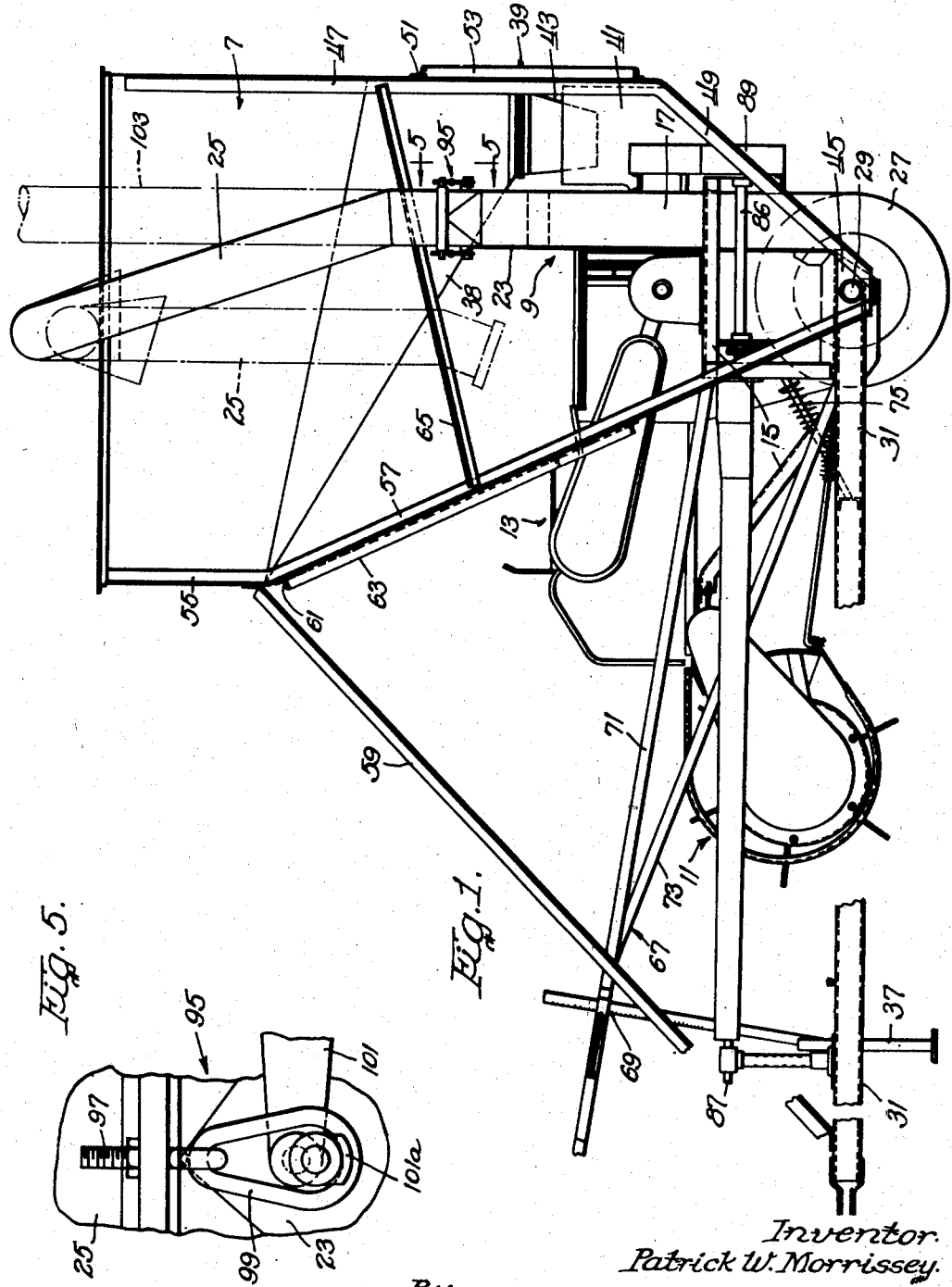

Inventor:
Patrick W. Morrissey
By Soans, Pond, & Anderson
Attys

Oct. 2, 1951 P. W. MORRISSEY 2,570,147
FIELD FORAGE HARVESTER
Filed March 14, 1947 3 Sheets-Sheet 3
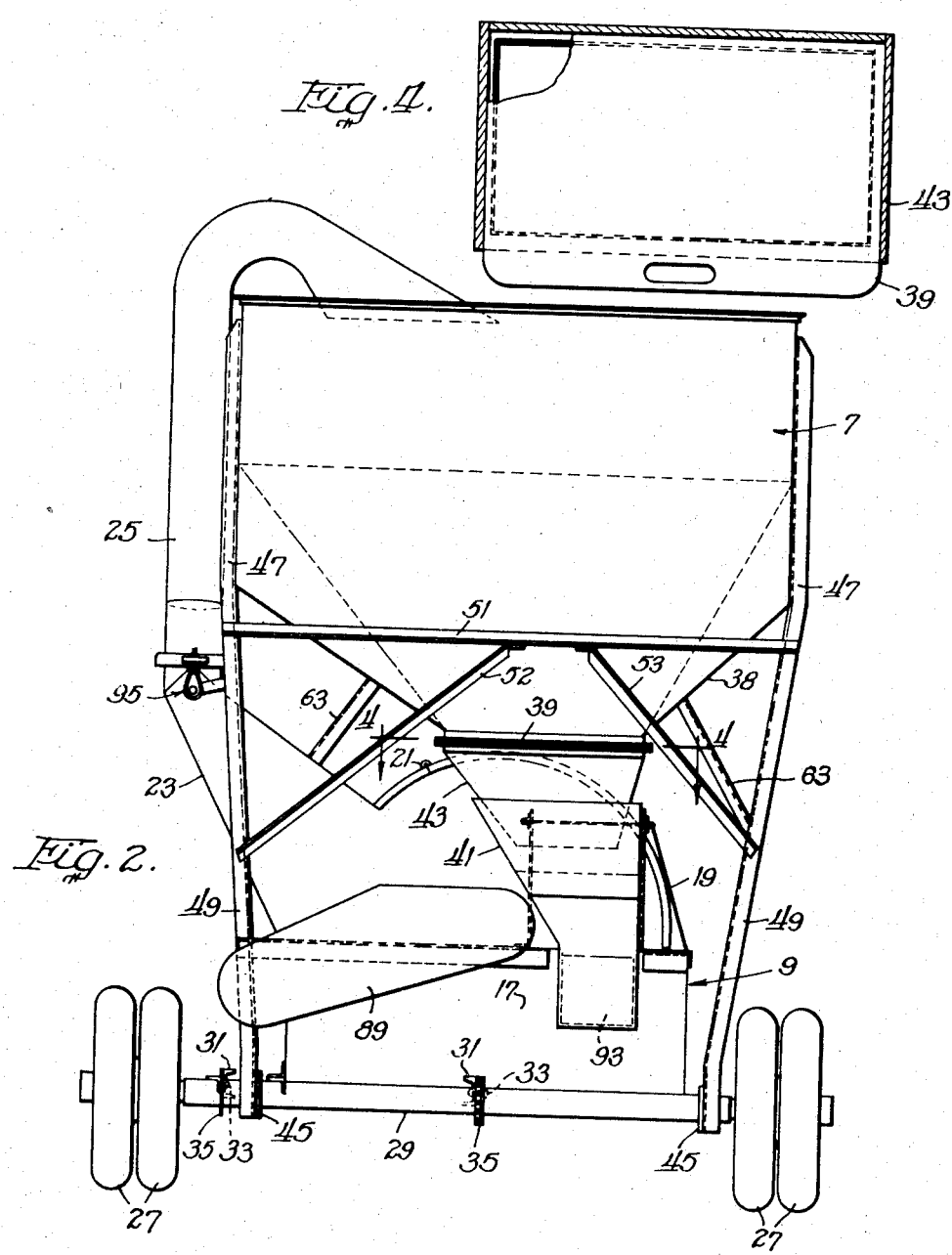
Inventor
Patrick W. Morrissey
By Soans, Pond & Anderson
Attys Patented Oct. 2, 1951

2,570,147

UNITED STATES PATENT OFFICE 2,570,147

FIELD FORAGE HARVESTER

Patrick W. Morrissey, Racine, Wis., assignor to
J. I. Case Company, a corporation of Wisconsin Application March 14, 1947, Serial No. 734,753

4 Claims. (Cl. 55—118)

The present invention relates to field forage harvesters, and, in particular, to field forage harvesters which include a storage bin or like structure as a part of the harvester itself.

A known and highly satisfactory type of field forage harvester has a combined cutting and delivery unit which is utilized as the basic support for the assemblage. Various attachments are provided which may be combined with this cutting and delivery unit to provide apparatus for accomplishing the harvesting and cutting of all types of forage crops. The combination of the cutting and delivery unit with a windrow pickup and a conveyor unit is adapted to harvest windrowed crops. If a mowing unit is added to the preceding combination, the harvester becomes adapted to harvest such standing field crops as hay, clover, alfalfa, etc. By providing the cutting and delivery unit with various row crop gathering, stalk cutting and conveying units, the same cutting and delivery unit becomes adapted to process fodder corn, sorghum, and the like simultaneously with the harvesting operation.

At the present time, it is necessary for a farmer to have various other pieces of equipment to cooperate with field forage harvesters as described above, in order to accomplish efficient harvesting. Several trucks or wagons, a separate silo filler and the labor of possibly as many as four men are required to efficiently store a forage crop processed by a forage harvester of this type. It is desirable at various times, especially on the small farm, to accomplish the work harvesting a forage crop with one man and no extra machinery, and the principal object of the present invention is to adapt forage harvesters of the subject type for operation in this manner.

This object is accomplished by the provision of a storage bin and certain related equipment, all adapted to be combined with the basic cutter and blower unit, with or without the addition of crop cutting and conveying means. The combined equipment provides an improved field forage harvester which will process a forage crop, deliver the processed crop into a storage bin, store the crop while it is transported to the silo or other disposition point, and upon reaching that point will be operable to convey the processed crop into the silo or other storage receptacle. I am aware that there have been farm implements designed to harvest a crop in the manner described and to store it temporarily while in transit to the storage point, the mechanism being operable to then convey the processed crop into a silo or another storage container. However, the prior art machines accomplish this operation by the use of extremely complicated conveyor and cutting mechanisms which consume large amounts of power, which require an extensive amount of maintenance work, and which have not, as a result, been used to any extent commercially.

Another object of the invention is to provide a storage bin for interchangeable unit harvesters of the class described which will not interfere with the interchangeability of the various mechanisms that are adapted to be attached to the basic cutting and delivery unit.

The apparatus of the invention, as will hereinafter appear, makes possible the use of a standard cutting and delivery unit to convey the processed crop both into the storage bin and from the storage bin into a silo without the use of separate conveyor units. Other objects and advantages will be apparent by reference to the following description and the accompanying drawings.

In the drawings:

Fig. 1 is a fragmentary, side elevational view of a forage harvester of the class described embodying the features of the invention;

Fig. 2 is a rear elevational view of the apparatus illustrated in Fig. 1;

Fig. 4 is a view taken on line 4—4 of Fig. 2; and

Fig. 5 is a sectional view taken on line 5—5 of Fig. 1.

Figure 3:
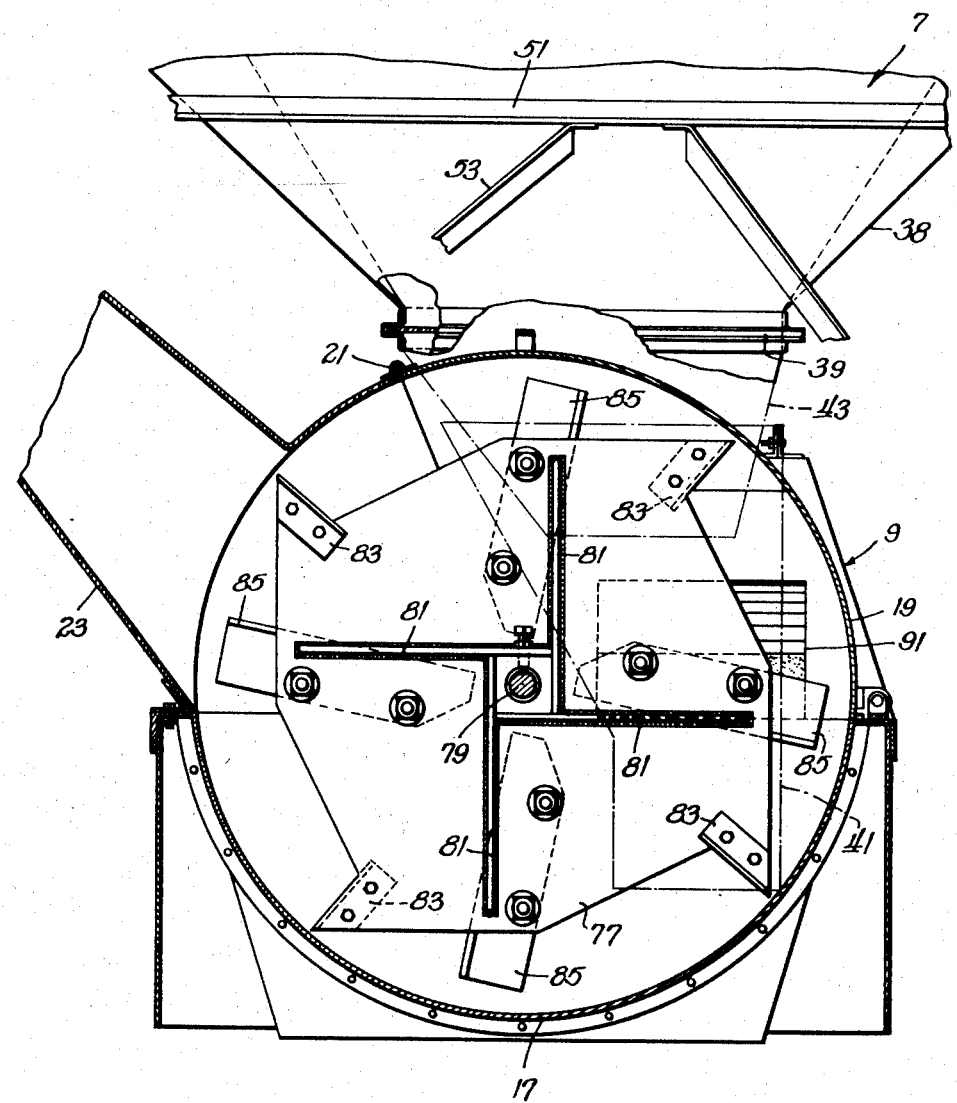
Fig. 3 is a fragmentary, sectional view of the cutting and blowing means included in the apparatus illustrated.

The field forage harvester illustrated is the type especially adapted to process a windrow crop such as hay, alfalfa, clover, etc. The harvester comprises a crop cutting and delivery unit 9, a windrow pickup unit 11 and a conveyor unit 13. The cutting and delivery unit has a main frame 15 upon which the pickup unit 11 and the conveyor unit 13 are supported so as to cooperate with the cutting and delivery unit 9. A storage bin 7 is supported above the cutting and delivery unit by means of structural members which maintain the storage bin 7 in a substantially fixed relation with the level of the field.

The pick-up unit 11 is of a conventional type and may be of the type described in Patent No. 2,378,107 which was issued to Stanley D. Russel and which was assigned to the assignee of the present invention. The conveyor unit 13 is also of a well known type and may be the same as the conveyor described in Patent No. 2,385,451 which was issued to Norman Krause et al.

The cutting and delivery unit 9 may include the same mechanism as that disclosed in the pending application, Serial No. 680,447, of Charles W. Hansen, which was filed on June 29, 1946, and which is assigned to the assignee of the present invention.

The crop cutting and delivery unit, a portion of the harvester, supports the complete harvester and includes a main frame 15 which is fabricated from suitable plate, angle and channel structural members which define a generally horizontal platform portion, and a housing 17 for the rotatable cutter and blower wheel. The blower housing 17 is in two halves, the lower half is rigid and aids in strengthening the frame structure, and the upper half section 19 is hinged by means of a pin 21 so as to permit the opening of the housing 17 for access to the cutting and blower wheel. At one side of the blower housing 17 there is provided an outlet conduit 23 for the cut crop material and to which at its upper end is detachably connected a delivery pipe 25 as will be described later. It is desirable that the delivery conduit 23 be shaped as shown in Figs. 2 and 3, so as to utilize a large part of the energy imparted to the crop material by the blower means.

Suitable supporting wheels 27 are journaled on an axle 29 which is affixed to the frame 15, in order that the harvester may be drawn behind a tractor or otherwise moved during use. A fabricated yoke-shaped drawbar 31, which includes a pair of channel side sections and suitable cross members, is hingedly connected to the axle 29 by means of hinge pins 33 which engage gusset plates 35 welded to the axle 29. It is intended that the complete harvester be drawn by, and powered from, a tractor. The forward end of the drawbar 31 is provided with an adjustable stand 37 in order that it may be supported at the proper elevation when the harvester is being attached to the tractor; the stand 37 is, of course, raised during the operation of the machine.

In tractor drawn harvesters of this general type, which are frequently coupled and uncoupled, it is desirable to support the implement upon the axle in a substantially balanced condition. It is also desirable to keep the center of gravity of the implement slightly forward of the axle, so that the implement stands firmly on the ground when it is uncoupled. The storage bin of the present invention is shaped and supported in a manner designed to accomplish this requirement.

The bin 7 is a large open-topped container having a rectangular cross-section at its upper end. The bin 7 has vertical upper side sections which are tapered inwardly and rearwardly to form a sloping bottom portion as shown at 38 in the drawings. The proportions of the bin 7 are such that the balance of the implement is maintained substantially independent of the level of the cut crop being stored in the bin. This is accomplished by so sloping the bottom portion of the bin that the sum of the turning moments produced by the inflowing crop material on the opposite sides of the transverse line of suspension of the bin remains substantially equal as the bin fills.

A sliding gate valve 39 (Fig. 4) is provided in the bottom of the bin to control the flow of crop material out of the bin. The crop material is guided into a chute or hopper 41 attached to the blower housing by means of a short spout 43 which is disposed beneath the gate valve 39 and which is attached to the bottom of the bin.

The bin 7 is supported upon a pair of gusset plates 45 which are journaled on the axle 29 by a frame fabricated from suitable structural members. The rear corners of the bin 7 are supported by vertically disposed angle members 47, which are connected to gusset plates 45 by the angle members 49. The rear of the structure is reinforced by a horizontally extending member 51 and a pair of reinforcing struts 52 and 53 which connect the horizontal member 51 with the members 49.

Vertically extending angle members 55 are provided at the forward corner of the bin, and these are connected to the gusset plates 45 by means of angle members 57. A forwardly extending member 59 rigidly connects the forward portion of the bin 7 with the drawbar 31 substantially as shown in the drawings. The forward portion of the bin 7 is reinforced by a horizontal member 61 similar to member 51 on the rear portion, and this is reinforced by cross members 63. A cross brace 65 is provided, as illustrated, to strengthen the side portions of the bin and the frame.

During the operation of the harvester it is frequently necessary to adjust the height of the pickup means 11 or other crop gathering means relative to the ground, and, since the conditions requiring such adjustment may change from time to time, it is important that the apparatus include means whereby the relative height of the pickup 11 can be adjusted prior to starting up and during the actual running of the harvester in the field. It is very desirable, therefore, that adjustments in the height of the harvester can be made independently of the storage bin 7 in order to keep the center of gravity of the storage bin 7 in a fixed position in relation to the supporting wheels 27. In the illustrated embodiment of the invention, this relative adjustment is made possible by the hinged connection between the drawbar 31 and the frame 15 of the cutter and delivery unit 9, which frame supports the pickup 11 and conveyor 13; thus by providing an adjustable connection between the drawbar 31 and the frame 15 it is an easy matter to adjust the height of the crop pickup means 11. This connection in the illustrated structures, includes a forwardly extending, adjusting lever 67 rigidly affixed to the cutting and delivering unit frame 15 which is adapted to be held in various positions relative to that frame by means of a link and spring latch connection 69.

The adjusting lever 67 constitutes a tripod which is fabricated of three suitably placed angle sections 71 and 73. Two of the angle sections 71 of the tripod lever 67 are affixed to the platform portion of the cutting and delivery unit frame 15. The other angle section 73 is affixed to one of the structural elements in the lower part of the frame 15. It will be apparent that movement of the tripod adjusting lever 67 up and down, relative to the drawbar 31, will rotate the counter-balanced pickup unit 11, the conveyor unit 13 and the crop cutting and delivery unit 9 about the main axle 29, thereby altering the position of the collecting means relative to the ground level without changing the position of the storage bin 7. In order that this adjustment may be made from the tractor unit without requiring the operator to stop the machine and dismount, the forward end of the adjusting lever is carried to a point just above the end of the drawbar and the weight, or a large portion of the weight of the mechanism carried on the main frame of the cutter and blower unit, is counter-balanced by a suitable compression spring 75.

The cutter and blower wheel constituting a part of the crop cutting and delivery unit, comprises a plate member 77, which is generally octagonal in form and which is cut from a piece of fairly heavy boiler plate. The cutter and blower wheel is supported for rotation within the blower housing 17 by a shaft 79 which is journaled in bearings affixed to the platform portion of the main frame 15. The wheel is provided with four symmetrically spaced, reinforcing ribs 81, four removable vanes or fan wings 83, and four removable and adjustable cutter knives 85. The cutter and blower wheel is adapted to be powered during the operation of the apparatus by means of a chain and sprocket connection to the main drive shaft 86 for the harvester. The main drive shaft 86 is journaled on the frame 15 of the cutting and delivery unit, and the forward end of the shaft 86 is arranged to be connected to the power take-off shaft of the tractor by means of a shaft 87 supported on the drawbar 31. The chain and sprocket drive for the cutter and blower wheel is covered by a safety shield 89.

The blower fan wings 83 constitute short pieces of angle iron which are bolted to the plate 77. The provision of the removable fan wings 83 makes possible a convenient adjustment of the volume of air delivered by the blower, since two or more of the wings can be removed as required. This is an important feature in an apparatus of this character, which must be capable of handling a wide variety of crop materials.

The sheet metal member which comprises the upper portion of the blower housing 17, is provided with a suitable forward opening 91 through which the crop material delivered by the conveying means 13 is admitted to the blower housing 17 for cutting and delivery.

Another inlet 93 is provided in the rear section of the blower housing 17 to admit the processed crop material which is stored in the bin 7 into the housing for delivery to the silo or other storage point as will be hereinafter described. The open topped flared chute 41, which is attached to the rear of the blower housing 17, serves to guide crop materials from the spout 43 on the storage bin 7 into the opening 93. The chute 41 and the spout 43 also cooperate to allow relative movement between the main frame with its associated pickup, conveyor, and cutting and delivery mechanisms, and the storage bin 7 which is maintained in a substantially fixed position in relation to the level of the field.

The rear opening 93 in the housing 17 should preferably be located on the side of the housing opposite from the delivery conduit 23. This location enables the crop material to reach a maximum velocity because the action of the blower is then supplemented by the mechanical action of the fan vanes 83 on the crop materials as they fall into the housing 17.

The hook-shaped delivery pipe 25 is adapted to be attached to the outlet conduit 23 of the blower housing 17 and extends between the upper portion of the outlet conduit 23 and the bin 7. The delivery pipe 25 and conduit 23 are connected by latching or locking means 95, which is particularly shown in Fig. 5. The locking means 95 consists of a pair of eye-bolts 97 attached to the delivery pipe 25, each having an elongated link 99 suspended therefrom. Each link 99 engages an eccentric latch 101 pivotally supported on the conduit 23. When the eccentric latches 101 are turned one-quarter revolution (101a) the conduit 23 and the pipe 25 are securely joined together.

In the illustrated apparatus, the windrow pickup 11, which is of the rotating tine type, is supported and counter-balanced from the frame 15 of the cutter and delivery unit 9, and is operatively connected to the cutting and delivery unit by means of the conveying unit 13. In operation in a windrowed field, the machine is drawn along the windrow to be processed by the tractor. The rotating pickup 11 gathers the crop material and deposits it upon the outer end of the conveyor 13 which moves it to the cutting and delivery unit 9. The rapidly rotating cutter knives 85 chop the material into suitable lengths, and the blower moves the cut crop material into the storage bin 7. When the bin 7 is filled, the operator may disconnect the conveyor and pickup drive, shut down the cutting and blowing wheel, and move the loaded implement to the silo or other disposition point. At the silo the hook-shaped delivery pipe 25 is disengaged and a stationary delivery pipe 103 mounted on the silo is connected to the delivery conduit 23 in a manner similar to the hook-shaped pipe 25. The cutting and blowing wheel is then rotated and the gate valve 39 is opened, allowing the cut crop material to fall into the blower housing 17 from which it is blown into the silo. The rate of flow of the crop material into the blower housing may be controlled by adjustment of the gate valve 39. When the storage bin 7 is empty the gate 39 is closed, the delivery pipe 25 is reconnected, and the machine is taken into the field to process another load. The entire operation may be carried out by one man, and this is of course a most important feature of the invention. Conventional operation of the apparatus is also possible.

It is apparent that the storage bin of the present invention may be installed on any of the types of forage harvesters which have, as their basic unit, a combined cutting and delivery unit. The bin is supported in a manner allowing relative movement between the harvesting machine proper and the bin opening, without using any complicated connecting means. No auxiliary conveying apparatus is necessary as the same delivery unit moves the crop into the bin after cutting as moves the processed crop from the bin and to the storage point.

The features of my invention that are believed to be new are expressly set forth in the appended claims.

I claim:

1. In a field forage harvester of the class described having crop pick-up and conveying mechanisms and support means for said mechanisms including an axle which has a pair of spaced-apart support wheels journalled thereon and which has a drawbar hingedly attached thereto by pivots which extend generally parallel to said axle, means for selectively storing and delivering processed crops comprising, in combination, a storage bin supported on said support means in fixed relation with said drawbar so as to maintain the center of gravity of said bin forward of said support wheels, a crop cutting and delivery unit supported on said support means and movable as a unit with said crop pick-up and conveyor mechanisms relative to said drawbar, said crop cutting and delivery unit including a housing having a delivery outlet, a main crop inlet for admitting the unprocessed crop, and a second inlet, said delivery outlet being selectively connectible to said storage bin and an external storage receptacle by conduit means, and means for connecting said storage bin to said second inlet in said housing, said connecting means allowing relative movement between said storage bin and said cutting and delivery unit and said crop pick-up and conveyor mechanisms.

2. In combination in a harvester of the class described, a cutting and delivery unit including support means having a frame and a pair of spaced-apart support wheels, a unitary cutting and delivery mechanism including a cutter and blower wheel having peripherally arranged fan vanes and generally radially extending knife blades which blades are disposed at one side of said wheel, and a housing for said cutter and blower wheel supported on said frame, said housing including a pair of opposed side walls one of which is disposed adjacent the side of said wheel upon which said knife blades are disposed and which defines a main crop inlet for admitting an unprocessed crop, said other side wall having a second inlet therein, said housing having a delivery outlet, a cut crop storage bin supported upon said support means, conduit means arranged to connect selectively said delivery outlet to said storage bin and to an external storage receptacle separate from said harvester, and means for connecting said bin to said second inlet.

3. In combination in a harvester of the class described, a cutting and delivery unit including support means having a frame, a unitary cutting and delivery mechanism including a cutter and blower wheel having peripherally arranged fan vanes and generally radially extending knife blades which blades are disposed at one side of said wheel, and a housing for said cutter and blower wheel supported on said frame, said housing including a pair of opposed side walls one of which is disposed adjacent the side of said wheel upon which said knife blades are disposed and which defines a main crop inlet for admitting an unprocessed crop, said other side wall having a second inlet therein, said housing having a delivery outlet, a cut crop storage bin supported upon said support means, means arranged to connect selectively said delivery outlet to said storage bin and to an external storage receptacle from said harvester, and means for connecting said bin to said second inlet.

4. In a field forage harvester of the class described having crop pick-up and conveying mechanisms and support means for said mechanisms including a frame, a unitary cutting and delivery mechanism including a cutter and blower wheel having peripherally arranged fan vanes and generally radially extending knife blades which blades are disposed at one side of said wheel, and a housing for said cutter and blower wheel supported on said frame, said housing including a pair of opposed side walls one of which is disposed adjacent the side of said wheel upon which said knife blades are disposed and which defines a main crop inlet for admitting an unprocessed crop from said crop pick-up and conveying mechanism, said other side wall having a second inlet therein, said housing having a delivery outlet, a cut crop storage bin supported upon said support means, means arranged to connect selectively said delivery outlet to said storage bin and to an external storage receptacle from said harvester, and means for connecting said bin to said second inlet.

PATRICK W. MORRISSEY.

REFERENCES CITED

The following references are of record in the file of this patent:

UNITED STATES PATENTS

| Number | Name | Date |
| --- | --- | --- |
| 926,599 | Peters | June 29, 1909 |
| 1,580,073 | Nothnagel | Apr. 6, 1926 |
| 1,615,334 | MacGregor | Jan. 25, 1927 |
| 1,858,147 | Forbidussi | May 10, 1932 |
| 2,157,619 | McElwain | May 9, 1939 |
| 2,253,633 | Lindly | Aug. 26, 1941 |
| 2,292,951 | MacDonald | Aug. 11, 1942 |
| 2,379,371 | Moschel et al. | June 26, 1945 |
| 2,385,451 | Krause et al. | Sept. 25, 1948 |